May 28, 1929.    W. T. OHMAN    1,715,073
ELECTRIC WIRE SERVICE BOX
Filed July 20, 1926
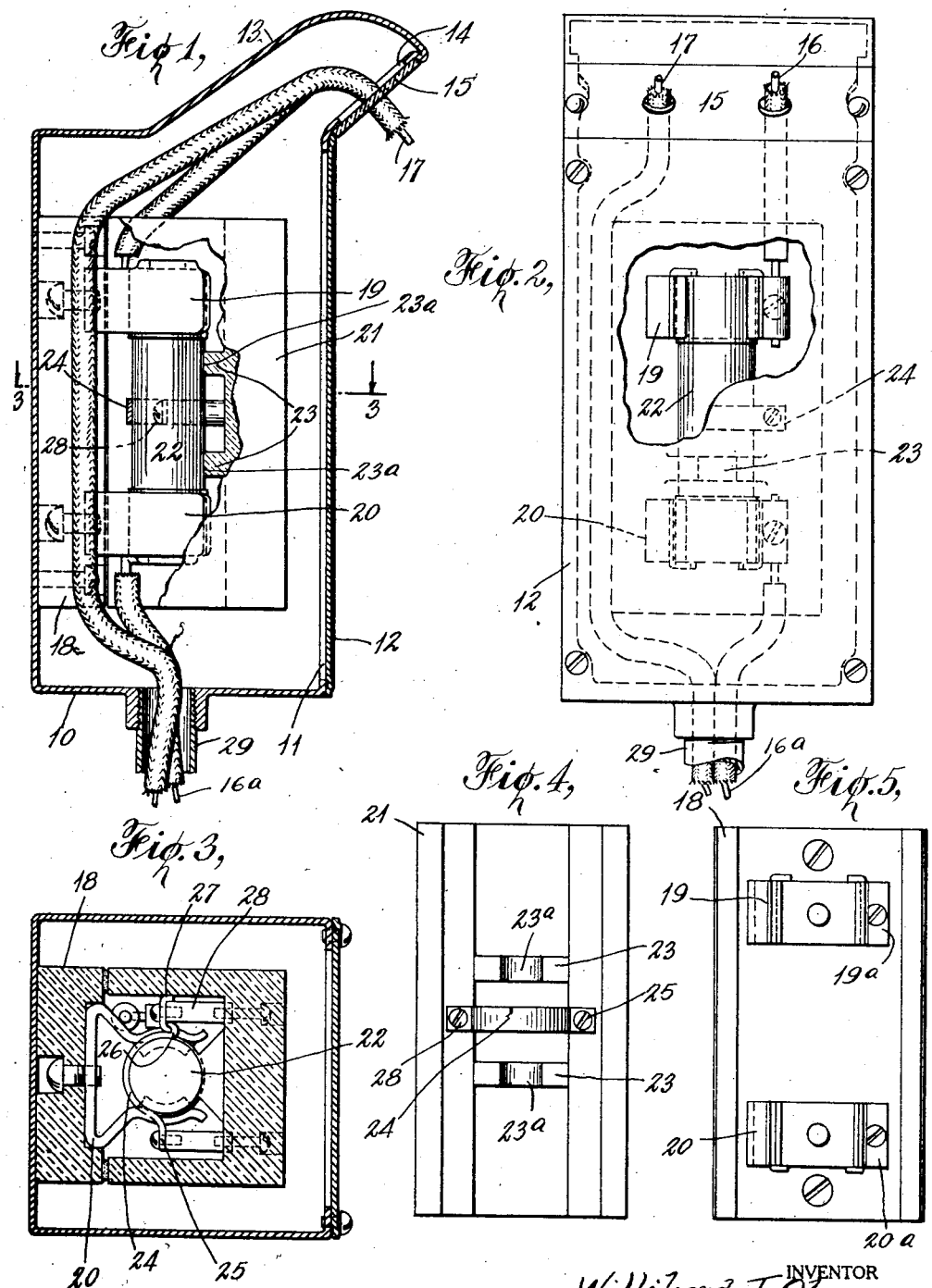
INVENTOR
Willihard T. Ohman
BY
ATTORNEY Patented May 28, 1929.

1,715,073

UNITED STATES PATENT OFFICE.

WILLIHARD T. OHMAN, OF GREAT KILLS, NEW YORK.

ELECTRIC-WIRE SERVICE BOX.

Application filed July 20, 1926. Serial No. 123,674.

This invention relates to boxes for use in connection with buildings of various kinds and classes to provide a suitable entrance and protection for electric service wires; and the object of the invention is to provide a box of the class and for the purpose specified having an upwardly and outwardly projecting hood portion into and through which the service wires are adapted to be passed, said hood portion preventing rain and the like from entering the box or case; a further object being to provide within a box or case a block of insulating material in connection with which is mounted two spring fuse clips arranged in spaced relation with means for coupling wires with said clips; a further object being to provide a cap or guard of insulating material for said block with means for retaining a fuse in connection with said cap or guard whereby the placement of the cap or guard in position will place the fuse supported thereby in the clips of said block, and further whereby the fuse may be removed from the clips whenever desired without danger of the operator coming in contact with live wires or the terminals of said wires, the box being provided with a detachable cover permitting the insertion and and removal of the cap or guard as well as the assemblage of the several parts of the device; and with these and other objects in view, the invention consists in a device of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a longitudinal, sectional view through my improved box and indicating the method of its use.

Fig. 2 is a face view of the box with part of the construction broken away.

Fig. 3 is a section on the line 3—3 of Fig. 1.

Fig. 4 is a face view of the cap or guard employed; and,

Fig. 5 is a face view of the insulated fuse clip block employed.

In practice, I provide an oblong, rectangular metal box or casing 10, the front wall of which is open as seen at 11 and adapted to be closed by a removable cover member 12. The front top portion of the box or case is provided with an upwardly and outwardly directed hood 13 having a downwardly directed open end 14 closed by a strip of insulating material 15 apertured to receive the positive and negative electric conductors 16 and 17 from a suitable source of electric supply which extend into and through the box or case.

Mounted in connection with the back wall of the box or case is a block 18 composed of any suitable insulating material such as porcelain, bakelite, hard rubber, etc. and mounted on the outer face of said block at spaced intervals are spring fuse clips 19 and 20, said spring clips having tubular terminals 19$^a$ and 20$^a$ at one side thereof to receive the positive circuit wire or conductor 16, and the extension 16$^a$ thereof as seen in Fig. 2 of the drawing.

I also employ a cap or protector 21 composed of suitable insulating material the same as the structure of the block 18. Said cap or protector is substantially U-shaped in form in cross section to provide a compartment extending longitudinally therethrough in which a fuse 22 is adapted to be supported on two spaced rests or supports 23 having arc-shaped surfaces 23$^a$. The fuse 22 is held against displacement from the cap 21 by a strap 24, one end of which is secured to the cap 21 as seen at 25 and the other end of which is hook-shaped in form as seen at 26 and adapted to engage a clip 27 supported in connection with the cap 21 as seen at 28. The strap 24 is positioned between the supports 23 as seen in Fig. 4 of the drawing, and in conjunction with said supports, will serve to fixedly retain the fuse 22 against displacement in the cap or protector 21.

The arrangement of the fuse 22 in the cap 21 is such that when said cap is placed in position, the terminals at the ends of the fuse will pass into the spring clips 19 and 20 and said clips will serve to retain the fuse, as well as the cap 21, in position. Whenever it is desired to substitute a new fuse for an old one, or one which has blown out, the cover 12 of the box or case 10 is removed and the cap or protector 21 grasped by the hand and pulled outwardly to disengage the fuse 22 from the clips 19 and 20, and the fuse may be removed by loosening the strap 24 and a new fuse substituted and replaced in the fuse clips. These operations are accomplished without any danger whatever of the hand coming in contact with live wires, which might cause serious injury to the operator. At the same time, the cap 21 serves to protect and guard the fuse to prevent destruction thereto.

It will be understood that it is preferred that the live or positive side of an electric circuit supply, for example the wire 16, be coupled with one of the terminals or fuse clips, namely the clip 19, and the extension of such wire, for example the wire 16ª be coupled with the other of said clips; while the other of the circuit wires 17 passes into and through the box or case without contact in any way with the fuse or fuse clips, both of the wires 16ª and 17 passing out through the bottom of the box or case 10 through a metal tube or pipe 29 coupled with the case 10 and being directed to the house current supply.

It will be understood, however, that my invention is not necessarily limited to the specific arrangement or coupling of the wires herein shown and described, nor am I necessarily limited to the specific structure of the box or case or the several parts thereof or to the use of a single fuse, and various changes in and modifications of the construction herein set out may be made within the scope of the appended claim without departing from the spirit of my invention or sacrificing its advantages.

Having fully described my invention, what I claim as new and desire to secure by Letters Patent, is:—

A fuse block comprising two bodies of insulating material, one of said bodies being in the form of a block and the other being channel-shaped in cross sectional form to form of said bodies when placed one upon the other, a box-shaped structure with a chamber therein opening outwardly through the opposite ends thereof, one of said bodies having centrally thereof spaced arcuate bearings forming a seat for a fuse, and a strap intermediate said bearings for retaining the fuse against displacement from said seat and the other of said bodies having spaced U-shaped spring terminals adapted to engage the terminal ends of the fuse supported in connection with the other body and to support said other body in connection with the last named body.

In testimony that I claim the foregoing as my invention I have signed my name this 15th day of July, 1926.

WILLIHARD T. OHMAN.